(12) United States Patent
Keys

(10) Patent No.: US 6,412,186 B1
(45) Date of Patent: Jul. 2, 2002

(54) I GAUGE AND PROCESS OF MEASURING (75) Inventor: James R. Keys, Concord, CA (US)

(73) Assignee: The Clorox Company, Oakland, CA (US)

( * ) Notice: Subject to any disclaimer, the term of this patent is extended or adjusted under 35 U.S.C. 154(b) by 8 days.

(21) Appl. No.: 09/704,428

(22) Filed: Nov. 1, 2000

(51) Int. Cl.$^7$ .............................................. G01B 3/00
(52) U.S. Cl. ......................... 33/544.4; 33/522; 33/542
(58) Field of Search .............................. 33/501.45, 522, 33/514.1, 542, 544.4, 549, 555.1

(56) References Cited

U.S. PATENT DOCUMENTS

| | | | |
|---|---|---|---|
| 1,424,082 A | * 7/1922 | Clopton | 33/514.1 |
| 1,808,955 A | * 6/1931 | Hilgenberg | 33/522 |
| 2,468,496 A | * 4/1949 | Ingle | 33/501.5 |
| 2,759,600 A | * 8/1956 | Saylor | 209/532 |
| 3,100,570 A | * 8/1963 | White | 209/532 |
| 3,387,704 A | 6/1968 | Powers, Jr. | |
| 3,390,569 A | * 7/1968 | McMeekin | 73/37 |
| 3,392,452 A | * 7/1968 | Haun | 33/549 |
| 3,464,547 A | 9/1969 | Becker | |
| 3,771,650 A | 11/1973 | Henderson et al. | |
| 3,914,872 A | 10/1975 | Strzala | |
| 3,921,303 A | 11/1975 | Zappia | |
| 4,008,525 A | * 2/1977 | Zappia | 33/522 |
| 4,044,892 A | 8/1977 | Loos | |
| 4,146,968 A | 4/1979 | Tovey | |
| 4,278,173 A | 7/1981 | Pemberton et al. | |
| 4,574,487 A | 3/1986 | Meyer, Jr. | |
| 4,936,018 A | * 6/1990 | Robinson et al. | 33/522 |
| 4,964,222 A | * 10/1990 | Keener | 33/544.4 |
| 4,987,768 A | 1/1991 | Dimmick et al. | |
| 5,065,524 A | 11/1991 | Langowski et al. | |
| 5,761,820 A | 6/1998 | Emery | |

FOREIGN PATENT DOCUMENTS

JP 01057114 A * 3/1989 ................ 33/555.1

* cited by examiner

Primary Examiner—Diego Gutierrez
Assistant Examiner—Mirellys Jagan
(74) Attorney, Agent, or Firm—DiPinto & Shimokaji, P.C.

(57) ABSTRACT

A gauge system for measuring internal diameters of tubular openings is provided. The gauge includes a support shaft, a planar surface coupled to the support shaft, and an elongate holder to movably hold a pair of measuring rods having tapered gauge ends with reference measurement markings. The planar surface supports a container in an upright position. The container includes a finish having an opening with a first predetermined inner diameter and a second predetermined inner diameter wherein the second diameter is smaller than the first diameter. The holder includes collars at both ends which are adapted to receive the measuring rods and allow the rods to move parallel to the vertical axis of the system and from an initial position into an extended position. The holder is pivotally mounted on the support shaft so as to allow a user to move the holder about the support shaft and relative to the planar surface and position one of the measuring rods above the finish opening. As the measuring rod is urged into the extended position, it moves vertically into the finish opening thereby allowing the user to determine the second diameter with respect to the reference markings.

21 Claims, 6 Drawing Sheets

Fig. 5

I GAUGE AND PROCESS OF MEASURING

BACKGROUND OF THE INVENTION

1. Field of the Invention

The present invention generally relates to measuring devices and, more particularly, to a device for measuring inner diameters of container finishes.

2. Description of the Related Art

In the manufacture of containers, certain dimensions are required to be within predetermined tolerance limits in order for the containers to function properly. In particular, the upper surface of the container, commonly known as the finish, must be maintained within certain manufacturing tolerances in order to provide adequate cap retention for a liquid tight seal to be formed between the container finish and the container cap.

Variations in the dimensions of containers, particularly plastic containers, may occur during molding or trimming operations due to many factors, including differences in the molds used to form the containers, shrinkage of the containers after molding, materials used, curing temperatures, and trimming operations. For containers that will hold fluids, including consumer products such as detergents and bleaches, it is important that the inner diameter of the container finish be within predetermined limits so that a fill tube to fill fluids into the container may enter the container without being obstructed. Variations with the inner diameter of the finish generally arise when the two mold halves are joined together, which results in an indentation. The indentation narrows the entry of the container and may obstruct the entry of the fill tube. Another problem that narrows the container finish is related to the design of the finish. Some detergent or bleach bottles, especially the ones with handles, may have an inner lip or shelf that extend into the finish. The shelf is formed along the mold part line and provides a smooth liquid flow from the bottle. Such lips or shelves located at the bottle neck may again obstruct the entry of the fill tube. In order to determine whether the inner diameter of a container finish is within predetermined dimensional tolerances, generally a sampling of the containers being produced is measured to determine actual dimensions.

Although it may vary depending on the container type, in general such sampling methods include manual measurement with a caliper. During the measurements, the calipers are positioned just off the part line and then the caliper extensions are inserted into the finish. The calipers are opened until contact with the inner walls is made. In order to avoid any false readings resulting from the indentations or the lip, however, the operator must line up the caliper contact surface just away from the center of the finish and try to hold the calipers parallel to the finish. However, such measurements are inconvenient and will include inaccuracies due to the manual placement of the calipers, which vary depending on the expertise of a particular user.

Accordingly, it would be desirable to provide a gauge that measures the true inner dimensions of a container finish.

SUMMARY OF THE INVENTION

The gauge system of the present invention provides an effective tool to inspect container finish defects occurring during the manufacture of the containers.

In one aspect of the present invention, a gauge system for measuring internal diameters of tubular openings includes a support shaft; a planar surface coupled to a first end of the support shaft and extending perpendicular to the shaft; a first measuring rod having a tapered end with a plurality of reference markings; and a holder member comprising a first end and an aperture positioned at the first end is adapted to receive the first measuring rod.

Specifically, the planar surface supports a container in an upright position. The container comprises a tubular neck having an opening with a first predetermined inner diameter and a second predetermined inner diameter. The tapered end of the measuring rod is adapted to pass through the opening of the tubular neck. The aperture in the holder allows the rod to move parallel to the vertical axis and from an initial position into an extended position. The holder includes a pivot portion to pivotally mount the holder on a second end of the support shaft so as to allow a user to move the holder member about the support shaft and relative to the planar surface and position the first measuring rod above the opening of the tubular neck of the container. When the measuring rod is urged into the extended position, the measuring rod moves vertically into the tubular neck thereby allowing the user to determine the second diameter of the tubular neck with respect to the reference markings.

In another aspect of the present invention, a process for measuring an inner diameter of a bottle finish includes the steps of providing a container comprising a tubular finish having an upper opening with a first predetermined diameter and an inner diameter wherein the inner diameter is smaller than the first predetermined diameter; placing the container on a planar surface of a measuring device in an upright position; positioning a measuring rod of the measuring device above the opening of the container wherein the measuring rod has a tapered end with a plurality of reference markings, wherein the tapered end of the measuring rod is adapted to pass through the upper opening of the container finish; urging the measuring rod into an extended position and into the upper opening of the tubular neck; and determining the inner diameter of the tubular neck with respect to the reference markings.

These and other features, aspects and advantages of the present invention will become better understood with reference to the following drawings, description and claims.

DETAILED DESCRIPTION OF THE INVENTION

Figure 1:
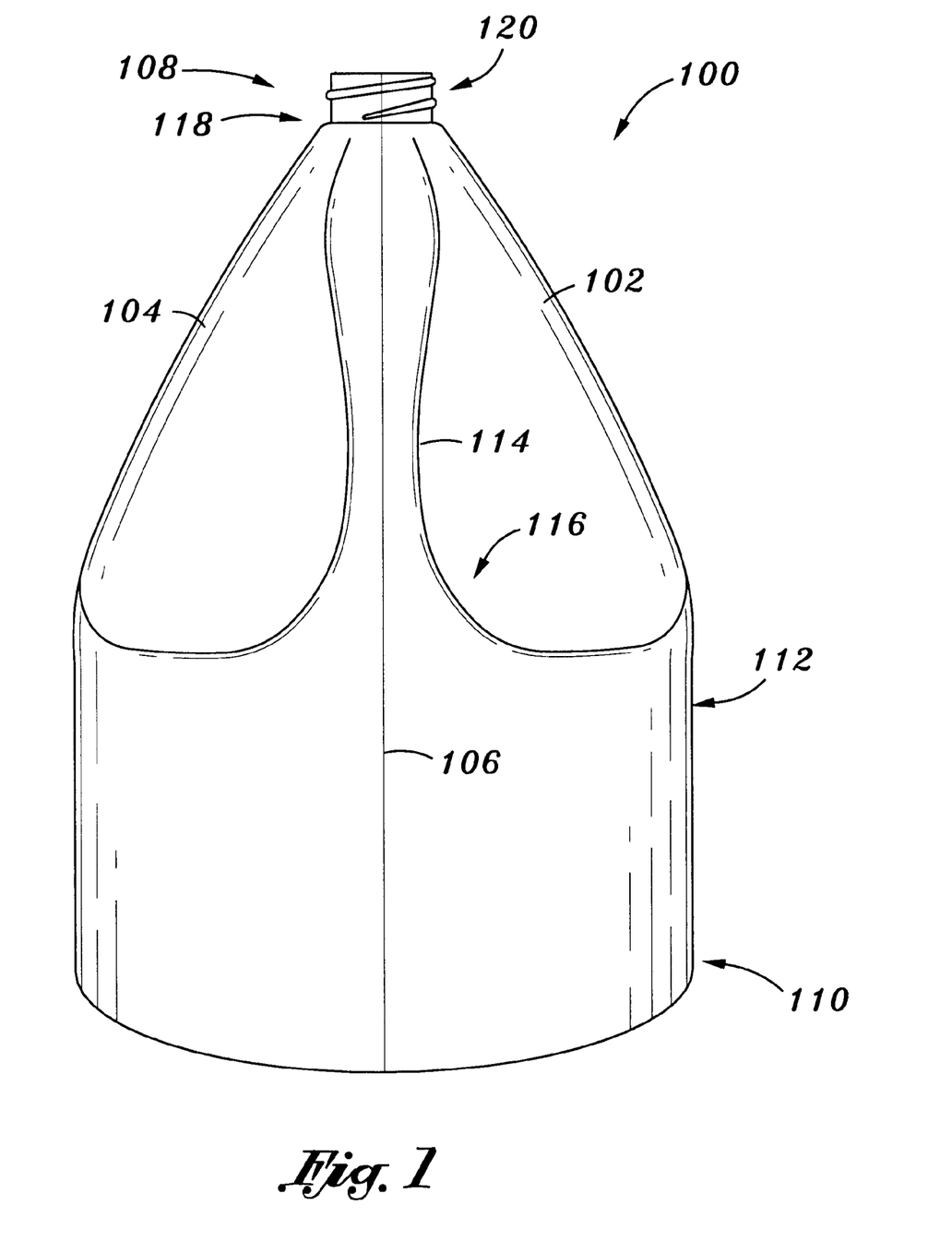
FIG. 1 is a schematic view of a fluid container having a finish portion.

Reference will now be made to the drawings wherein like numerals refer to like parts throughout. FIG. 1 illustrates an exemplary plastic container 100, such as a bottle, to hold fluids such as detergent or bleach, or the like. The bottle may be manufactured by combining a first half 102 and a second half 104 through a molding part line 106 using well known processes in the art of container manufacturing. In the preferred embodiment, the bottle may be made of high-density polyethylene. The bottle 100 may comprise a top portion 108 and a bottom portion 110. A body 112 of the bottle 100 is configured to retain fluids. A handle 114 is formed at a first location 116 of the body 112 and extends up to a second location 118 where the body 112 and a finish portion 120 are joined together. In this embodiment, the finish is formed as an opening shaped as a neck or a short tube where the fluids are filled in or dispensed out of the bottle 100.

Figure 2A:
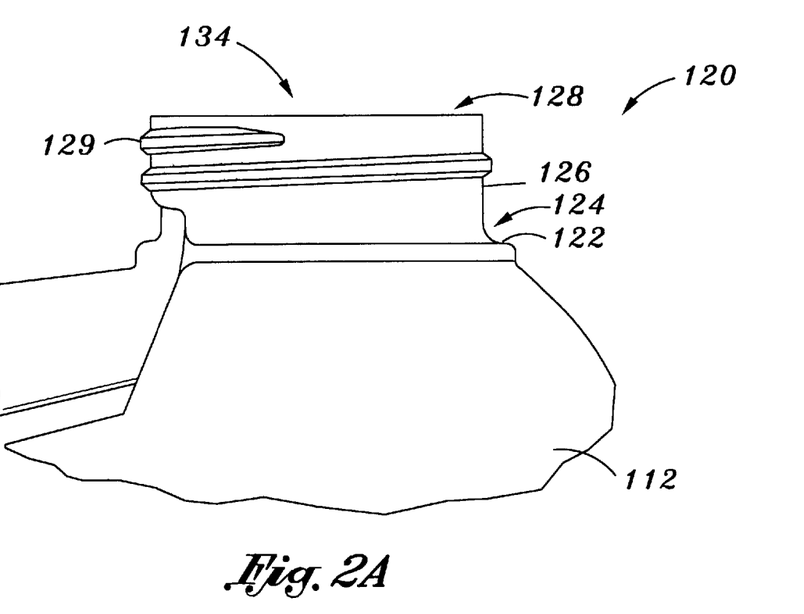
FIG. 2A is a detailed schematic view of the finish portion shown in FIG. 1.

As shown in FIG. 2A, the finish portion 120 of the bottle 100 may be integrally connected to the body 112 through a shoulder portion 122 at a lower end 124 of the finish 120. An outer circumferential side wall 126 extends between the lower end 124 and an upper end 128 of the finish 120. On the outer side wall 126, the bottle finish 120 may have threads 129 for retaining a cap (not shown).

Figure 2B:
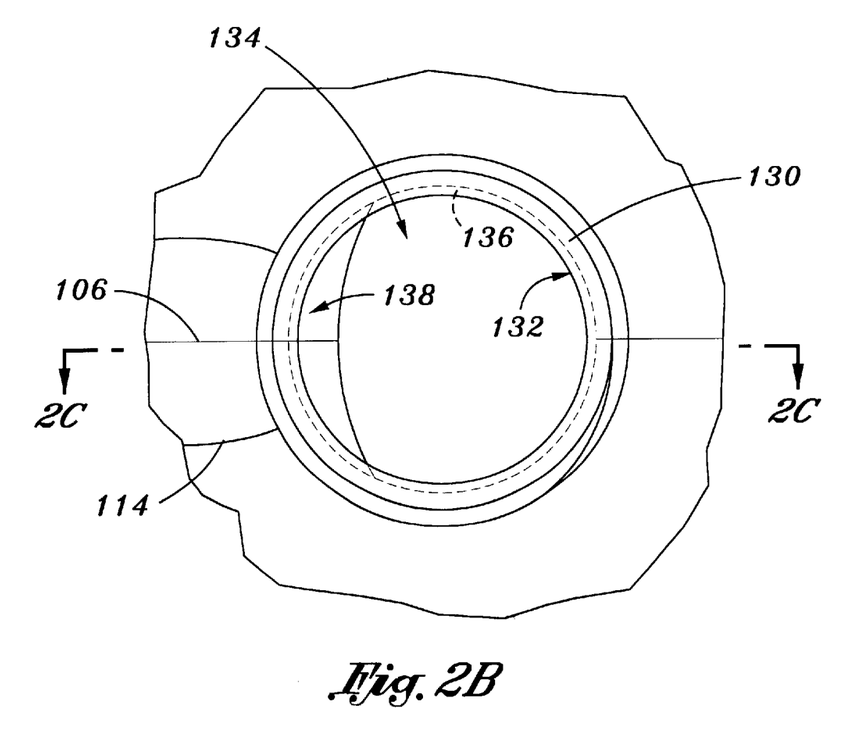
FIG. 2B is a plan view of the finish portion shown in FIG. 2A.
Figure 2C:
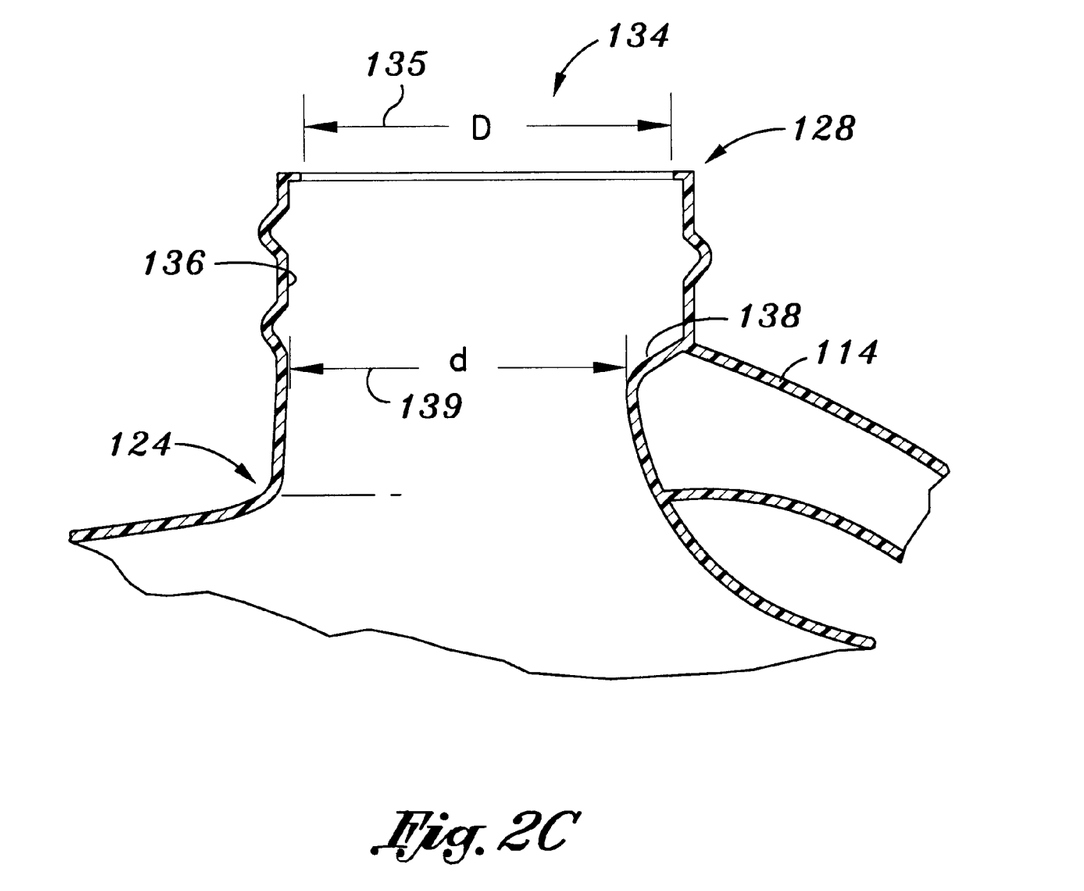
FIG. 2C is a side view, partially in cross section, of the finish portion shown in FIG. 2B.

As shown in FIG. 2B, in a top view of the bottle 100, the finish 120 may also comprise an upper surface 130 and inner circumferential side wall 132 defining a finish opening 134 having a lip. In this example, the opening 134 may comprise a generally upwardly straight side wall section 136 and an inwardly bulged wall section 138. The inwardly bulged wall section 138 will hereinafter be referred to as a "shelf." As previously mentioned, the shelf 138 is an essential part of the smooth pour feature formed along the mold part line and where the handle 114 is combined with the lower portion 124 of the finish 120. As shown in FIG. 2C in side view, the opening 134, a first inner diameter 135, depicted as D, is larger at the upper end 128 of the opening 134 than a second inner diameter 139 at the proximity of the shelf 138, which is depicted as d. Although not shown in the drawings, the indentation byproduct may also cause inaccurate measurements of the second inner diameter 139. If the second inner diameter 139 is mistakenly measured from the indentation, the measurement d will be larger than the true inner diameter, possibly making the diameter seem to be within the specification, when in reality the diameter 139 is too small and may cause interference with the filling tube. Therefore, the second inner diameter 139 or d of the finish opening 134 must be routinely inspected to determine whether the d distance is in predetermined manufacturing limits. The gauge system 200 of the present invention provides an effective tool to facilitate this inspection process.

Figure 3:
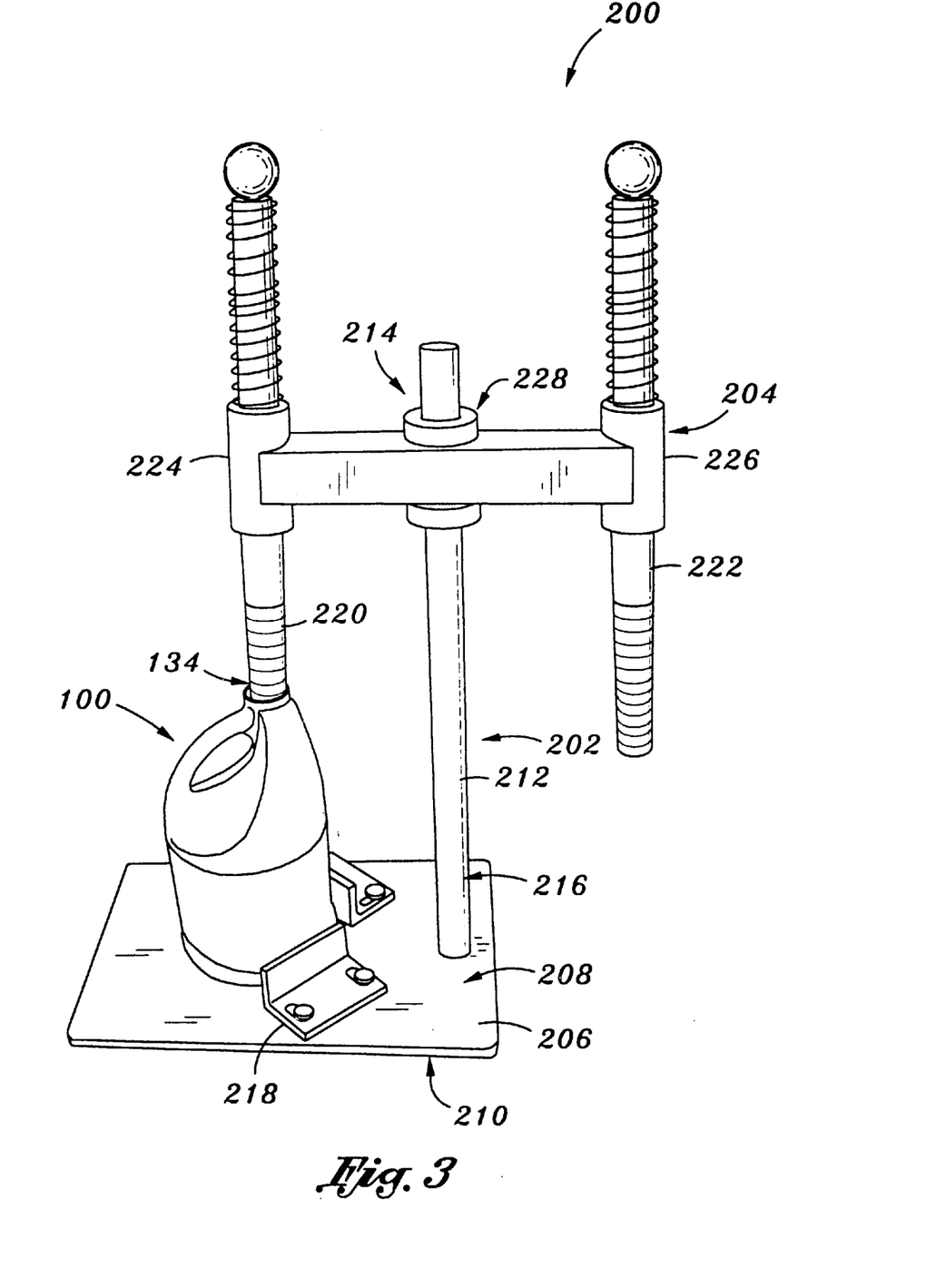
FIG. 3 is a perspective view of the gauge system of the present invention mounted on a bottle finish for inspection.

FIG. 3 shows the gauge system 200 of the present invention with the bottle 100 during the measurement process. The gauge system 200 of the present invention may be comprised of a gauge stand portion 202 and a gauge holder portion 204. The gauge stand 202 is further comprised of a support plate 206 having upper and lower surfaces 208 and 210, and a support shaft 212 having lower and upper ends 216 and 214. The support shaft 212 is perpendicularly mounted on the upper surface 208 of the support plate 206 from the lower end 216 using conventional means. The support plate 206 is to hold and stabilize the bottle 100 under measurement processes. Once the bottle 100 is placed on the upper surface 208, it is further stabilized using one or more L-brackets 218 which are movably mounted on the plate 206 so as to hold bottles with the predetermined sizes at predetermined positions on the plate 206.

The gauge holder portion 204 is configured to hold a first and a second measuring rods 220 and 222 to measure the second diameter 139 of the bottles with different sizes. As will be described more fully hereinbelow, in this embodiment, the first measuring rod 220 may be configured to measure or detect a bottle finish having a second inner diameter 139 of about 0.810 inch. That may indicate that a fill tube up to about a 0.810 inch outer diameter may fit into a bottle with about a 0.810 inch second diameter. Similarly, the second measuring rod 222 may be configured to measure or detect a finish with about a 0.950 inch second inner diameter.

In the preferred embodiment, the holder portion 204 may be comprised of an elongate bar comprising a first end 224 and a second end 226. The holder 204 may be pivotally mounted on the first end 214 of the support shaft 212 through a pivot portion 228 of the holder 204. When mounted on the shaft 212, the lateral axis of the holder 204 is substantially parallel to the support plate 206 and is able to rotate 360 degrees about the support shaft 212. The support plate 206 may be sized to have approximate dimensions of 12"×8"×⅜". The support shaft 212 may be in the approximate range of 18"×1". Although in the preferred embodiment, the holder portion 204 is described as an elongate bar, it is within the scope of this invention that it may be designed in different shapes and configurations to hold one or more measuring rods, for example cross or star shaped bars, or the like.

Figure 4:
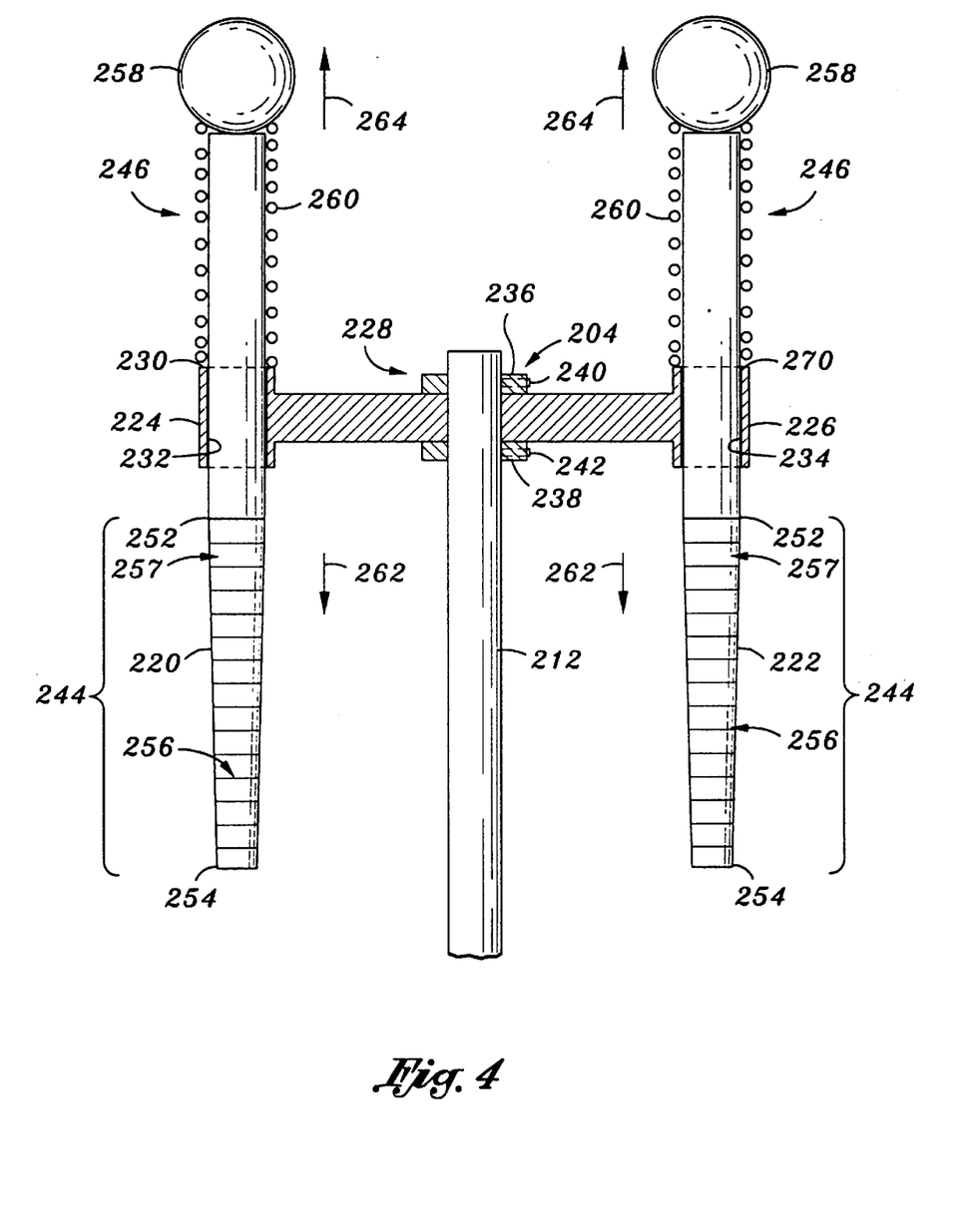
FIG. 4 is an enlarged view of a portion of the gauge system illustrating the measuring rods held by the holder of the invention.

As shown in FIG. 4, the first end 224 of the holder 204 may comprise a first aperture 230 or a first collar to movably receive the first measuring rod 220. Similarly, the second end 226 of the holder 204 may comprise a second aperture 270 or a second collar to movably receive the second measuring rod 222. In this embodiment, the first and second collars 230 and 270 are preferably defined and shaped by cylindrical side walls 232 and 234, and sized to accommodate the measuring rods 220 and 222 in a substantially vertical position and with minimum play tolerance. In one embodiment, the pivot portion 228 may be formed as a pivot hole located at the center of the holder 204 and substantially between the first and the second collars 230 and 270. The first and second collars 230 and 270, the pivot hole 228, and the holder 204 may be manufactured from a durable material, such as metals, alloys or hard plastics, and as a single piece or an assembly of the aforementioned parts. The holder 204 may be sized to have 10.5" length, 1.5" width and 1.5" height. The collars 230, 270 may have an approximate outer diameter of 1.75"–2" and an inner diameter of 1".

As previously mentioned, the holder 204 may be rotated about the shaft 212 so as to align measuring rods 220 and 222 selectively above the finish opening 134, i.e., lateral or radial positioning of the holder 204. Depending on the height of the bottle undergoing the measuring process, the vertical position or height of the holder 204 may be adjusted using adjustable collars 236 and 238 along the shaft 212 (FIG. 4). Accordingly, once the selected height and lateral position is decided, screws 240 and 242, preferably Allen head screws, on the adjustable collars 236 and 238 are tightened to fix the position of the holder 204 above the finish opening 134.

In accordance with the principles of the present invention, each of the measuring rods 220 and 222 may be comprised of bottom and top rod portions 244 and 246. Both measuring rods are preferably cylindrical rods. The bottom rod portions 244 are preferably tapered such that the diameters of upper ends 252 are uniformly reduced along the bottom portions 244 down to the diameters of lower ends 254. The bottom rod portions 244 or the tapered rod portions comprise measurement marks 256 or lines with about 0.005 inch increments, in this embodiment, with numbers inscribed on the surface 257 of the tapered rod portions 244. In this embodiment, the first measuring rod 220 may be used to measure inner finish diameters in the range of about 0.790 to 0.830 inches while the second measuring rod 222 may be used to measure inner finish diameters in the range of about 0.930 to 0.970 inches. The gauge system 200 is able to measure inner diameters in thousandths with a plus-minus 0.002 inch error precision. The tapered portions may have approximate diameter ranges of 0.930" to 0.970", and 0.790" to 0.830". The tapered portions are approximately 4.5" long and include 0.5" increments.

The top rod portions 246 of the measuring devices 220 and 222 are generally shaped as cylindrical rods and movably held by the collars 230 and the 270. The top rod portions 246 extend between the upper end 252 of the bottom portion 244 and knobs 258. Springs 260 placed between the knobs 258 and the collars 230, 270 enable measuring rods 220 and 222 to vertically move in a first direction 262 and a second direction 264. Specifically, when the knobs 258 are pressed in the first direction 262, the springs 260 are compressed and allow the measuring rods 220, 222 to move in the first direction 262 and into an extended or measuring position. The springs 260 bias the measuring rods 220 and 222 in the second direction 264 and into an initial position of the measuring rods 220 and 222 so that when the pressure over the knobs 258 is released the measuring rods 220 and 222 return to their initial position. The top portions may be approximately 6.5" in length and 1" in diameter. Knobs may have an approximate diameter of 1.75" and a height of 1.25". The spring may have an approximate uncompressed length of 6.5". The rods may be made of metals, alloys and hard plastics.

As mentioned above, the gauge system of the present invention can be used to measure inner diameters of the container finishes of different sizes. Referring back to FIG. 3, the operation of the gauge system 200 may be exemplified using the first measuring rod 220. Once the bottle with a selected finish size is placed on the support plate 206, it is secured by the L-brackets 218 in an upright position. Then, as described in detail above, the measuring rod 220 is positioned above the finish opening 134 of the bottle 100.

Figure 5:
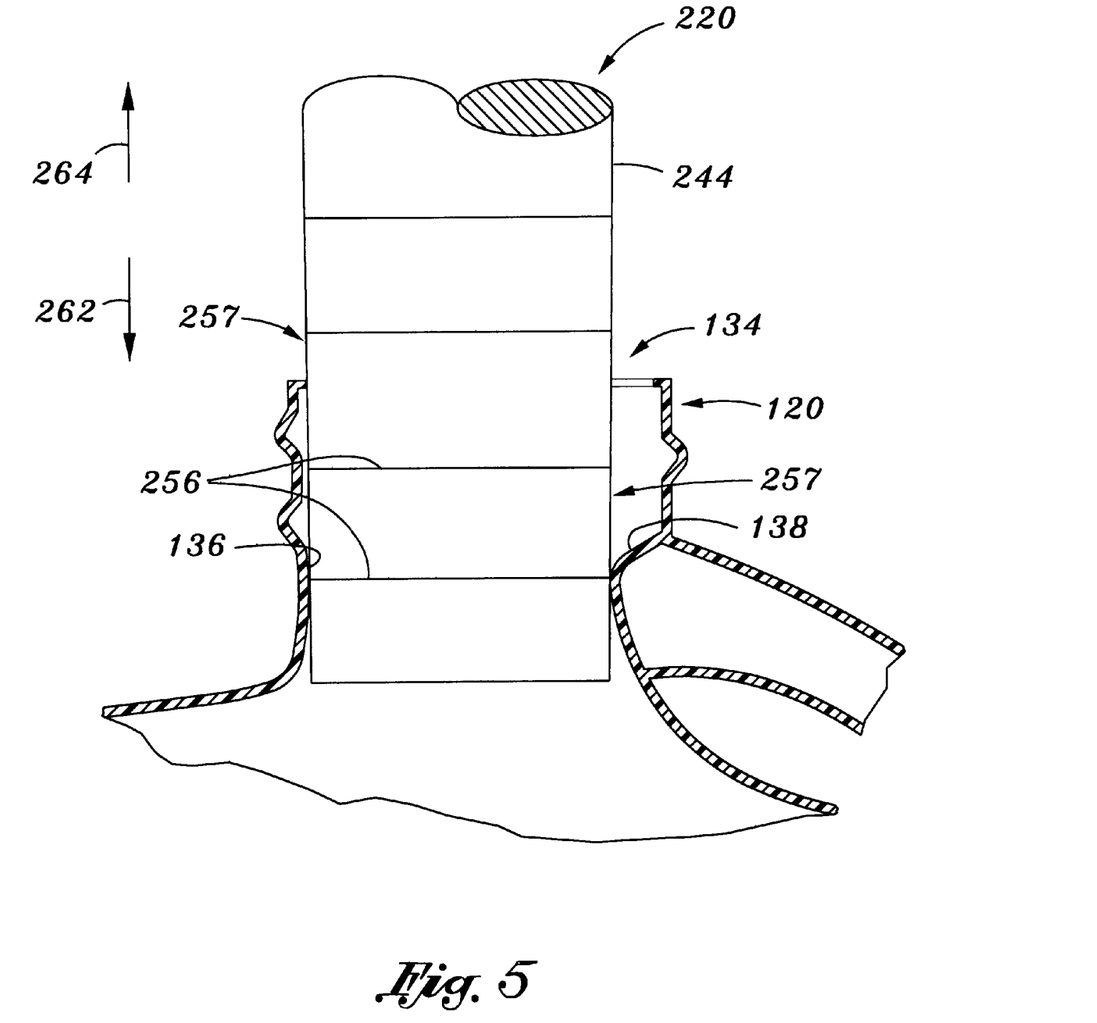
FIG. 5 is a side view, partially in cross section, illustrating the measurement of the second inner diameter of the bottle finish.

As illustrated in FIG. 5, as the first measuring rod 220 is moved in the first direction 262, the bottom portion 244 enters the finish 120 through the opening 134. A user takes a measurement when the surface 257 of the bottom portion 244 contacts both the lip portion 138 and the straight side wall 136 of the finish opening 134. The measuring line 256 that is closest to the contacting surfaces gives the second inner diameter d.

It should be understood, of course, that the foregoing relates to preferred embodiments of the invention and that modifications may be made without departing from the spirit and scope of the invention as set forth in the following claims.

I claim:

1. A gauge system for measuring internal diameters of tubular openings, comprising:
   a support shaft;
   a surface coupled to an end of the support shaft, the surface supports a container in a position wherein the container comprises a tubular neck having an opening with a first predetermined inner diameter and a second predetermined inner diameter;
   a measuring rod having a tapered end with a plurality of reference markings, wherein the tapered end of the measuring rod is adapted to pass through the opening of the tubular neck; and
   a holder member comprising:
      a first end;
      an aperture positioned at the first end, said aperture being adapted to receive the measuring rod, to allow the first measuring rod to move relative to a vertical axis of the measuring rod, and to allow the measuring rod to move from a first initial position into a second extended position; and
      a pivot portion to pivotally mount the holder member on a second end of the support shaft so as to allow a user to move the holder member about the support shaft and relative to the surface and to position the measuring rod above the opening of the tubular neck of the container such that when the measuring rod is urged into the second extended position, the measuring rod moves into the tubular neck thereby allowing the user to determine the second inner diameter of the tubular neck with respect to the reference markings.

2. The gauge system of claim 1, further comprising a spring connected to the measuring rod so as to bias the measuring rod into the first initial position.

3. The gauge system of claim 2, further comprising a second measuring rod having a second tapered end with a plurality of second reference markings, wherein the second tapered end of the second measuring rod is adapted to pass through a second tubular neck of a second container, wherein an upper opening of the second tubular neck has a third predetermined diameter.

4. The gauge system of claim 3, wherein the second measuring rod is movably received by a second aperture positioned at a second end of the holder member.

5. The gauge system of claim 4, wherein the pivot portion is located between the first and the second ends of the holder member so as to allow a user to move the holder member selectively about the support shaft and relative to the surface and to position the second measuring rod above the upper opening with the third predetermined diameter such that when the second measuring rod is urged into a second extended position, the second measuring rod moves into the second tubular neck thereby allowing the user to determine a fourth inner diameter of the second tubular neck with respect to the second reference markings.

6. The gauge system of claim 5, wherein the second aperture allows the second measuring rod to move relative to a vertical axis of the second measuring rod, and from a second initial position into a second extended position.

7. The gauge system of claim 6, further comprising a second spring connected to the second measuring rod so as to bias the second measuring rod into the second initial position.

8. A process of measuring an inner diameter of a bottle finish, comprising:
   providing a container comprising a tubular finish having an upper opening with a first predetermined diameter and an inner diameter wherein the inner diameter is smaller than the first predetermined diameter;
   placing the container on a surface of a measuring device in a fixed position;
   positioning a measuring rod of the measuring device above the opening of the container wherein the measuring rod has a tapered end with a plurality of reference markings, wherein the tapered end of the measuring rod is adapted to pass through the upper opening of the container finish;
   urging the measuring rod into an extended position and into the upper opening of the tubular neck; and determining the inner diameter of the tubular neck with respect to the reference markings.

9. The process of claim 8, further comprising securing the container with adjustable brackets mounted on the surface prior to the step of positioning the measuring rod.

10. The process of claim 8, wherein the step of urging the measuring rod comprises applying a pressure on the measuring rod and holding the pressure.

11. The process of claim 8, further comprising removing the measuring rod after determining the inner diameter.

12. A gauge system for measuring internal diameters of tubular openings, comprising:
- a support shaft;
- a surface coupled to a first end of the support shaft, the surface supports a first container in a first position wherein the first container comprises a first tubular neck having an opening with a first predetermined inner diameter and a second predetermined inner diameter;
- a first measuring rod comprising:
  - a first tapered end with a plurality of first reference markings;
  - wherein the first tapered end of the first measuring rod is adapted to pass through a first tubular neck of a first container, wherein an upper opening of the first tubular neck has a second predetermined diameter;
- a second measuring rod comprising:
  - a second tapered end with a plurality of second reference markings;
  - wherein the second tapered end of the second measuring rod is adapted to pass through a second tubular neck of a second container, wherein an upper opening of the second tubular neck has a third predetermined diameter;
- a holder member comprising:
  - a first end;
  - an aperture positioned at the first end, said aperture being adapted to receive the first measuring rod, to allow the first measuring rod to move relative to a vertical axis of the first measuring rod, and to allow the first measuring rod to move from a first initial position into a second extended position;
  - a second end;
  - an aperture positioned at the second end, said aperture being adapted to receive the second measuring rod, to allow the second measuring rod to move relative to a vertical axis of the second measuring rod, and to allow the second measuring rod to move from a first initial position into a second extended position; and
  - a pivot portion, located between the first and the second ends of the holder member so as to allow a user to move the holder member selectively about the support shaft and relative the surface and to position the second measuring rod above the upper opening with the third predetermined diameter such that when the second measuring rod is urged into the second extended position, the second measuring rod moves into the second tubular neck thereby allowing the user to determine a fourth inner diameter of the second tubular neck with respect to the second reference markings.

13. The gauge system of claim 12, further comprising a first spring connected to the first measuring rod so as to bias the first measuring rod into the first initial position.

14. The gauge system of claim 13, further comprising a second spring connected to the second measuring rod so as to bias the second measuring rod into the second initial position.

15. A process of measuring an inner diameter of a bottle finish comprising:
- providing a first container comprising a tubular finish having an upper opening with a first predetermined diameter and an inner diameter wherein the inner diameter is smaller than the first predetermined diameter;
- placing the first container on a surface of a measuring device in a fixed position;
- positioning a first measuring rod of the measuring device above the opening of the first container wherein the first measuring rod has a tapered end with a plurality of reference markings, wherein the tapered end of the first measuring rod is adapted to pass through the upper opening of the first container finish;
- urging the first measuring rod into an extended position and into the upper opening of the tubular neck of the first container;
- determining the inner diameter of the tubular neck of the first container with respect to the reference markings of the first measuring rod;
- providing a second container comprising a tubular finish having an upper opening with a first predetermined diameter and an inner diameter wherein the inner diameter is smaller than the first predetermined diameter;
- placing the second container on a surface of a measuring device in a fixed position;
- positioning a second measuring rod of the measuring device above the opening of the second container wherein the second measuring rod has a tapered end with a plurality of reference markings, wherein the tapered end of the second measuring rod is adapted to pass through the upper opening of the second container finish;
- urging the second measuring rod into an extended position and into the upper opening of the tubular neck of the second container; and
- determining the inner diameter of the tubular neck of the second container with respect to the reference markings of the second measuring rod.

16. The process of claim 15, further comprising securing the first container with adjustable brackets mounted on the surface prior to the step of positioning the first measuring rod.

17. The process of claim 16, further comprising securing the second container with adjustable brackets mounted on the surface prior to the step of positioning the second measuring rod.

18. The process of claim 15, wherein the step of urging the first measuring rod comprises applying a pressure on the first measuring rod and holding the pressure.

19. The process of claim 18, wherein the step of urging the second measuring rod comprises applying a pressure on the second measuring rod and holding the pressure.

20. The process of claim 15, further comprising removing the first measuring rod after determining the inner diameter of the tubular neck of the first container.

21. The process of claim 20, further comprising removing the second measuring rod after determining the inner diameter of the tubular neck of the second container.

* * * * *